United States Patent [19]

Malarz et al.

[11] 4,402,234
[45] Sep. 6, 1983

[54] THREE-AXIS WRIST MECHANISM

[75] Inventors: Antoni J. Malarz, Warren; Gerald C. Rieck, Sterling Heights, both of Mich.

[73] Assignee: General Motors Corporation, Detroit, Mich.

[21] Appl. No.: 292,725

[22] Filed: Aug. 13, 1981

[51] Int. Cl.³ .................... B25J 17/02; F16H 1/22; G05G 11/00

[52] U.S. Cl. ........................................ 74/417; 3/12.4; 74/479; 269/61; 269/71; 285/184; 414/1; 414/4

[58] Field of Search ............... 74/417, 479; 3/1.1, 3/12.4, 12.5; 269/61, 71; 285/184, DIG. 13, DIG. 21; 414/1, 4

[56] References Cited

U.S. PATENT DOCUMENTS

| | | | |
|---|---|---|---|
| 3,231,098 | 1/1966 | Ainsworth | 414/1 |
| 3,315,542 | 4/1967 | Fortin et al. | 414/1 X |
| 3,600,967 | 8/1971 | Auguin et al. | 269/71 X |
| 3,985,238 | 10/1976 | Nakura | 414/4 X |
| 4,062,455 | 12/1977 | Flatau | 414/4 X |
| 4,068,536 | 1/1978 | Stackhouse | 74/417 |

Primary Examiner—Allan D. Herrmann
Attorney, Agent, or Firm—Donald F. Scherer

[57] ABSTRACT

A three-axis wrist mechanism has three independent rotational axes with a point of mutual intersection. A stationary housing contains one of the axes while another axis is disposed in a tool support member. An intermediate axis is disposed in an intermediate housing. A plurality of gear trains provide the independent rotation of components about the three axes to permit selective positioning of a tool mounting surface within a substantially hemispherical envelope. The gear trains are arranged so that an unobstructed gear passage is maintained between the stationary base and the tool support member for accommodating hoses and/or wires which are used to transmit fluid and power to a tool mounted on the mounting surface of the tool support member.

3 Claims, 2 Drawing Figures

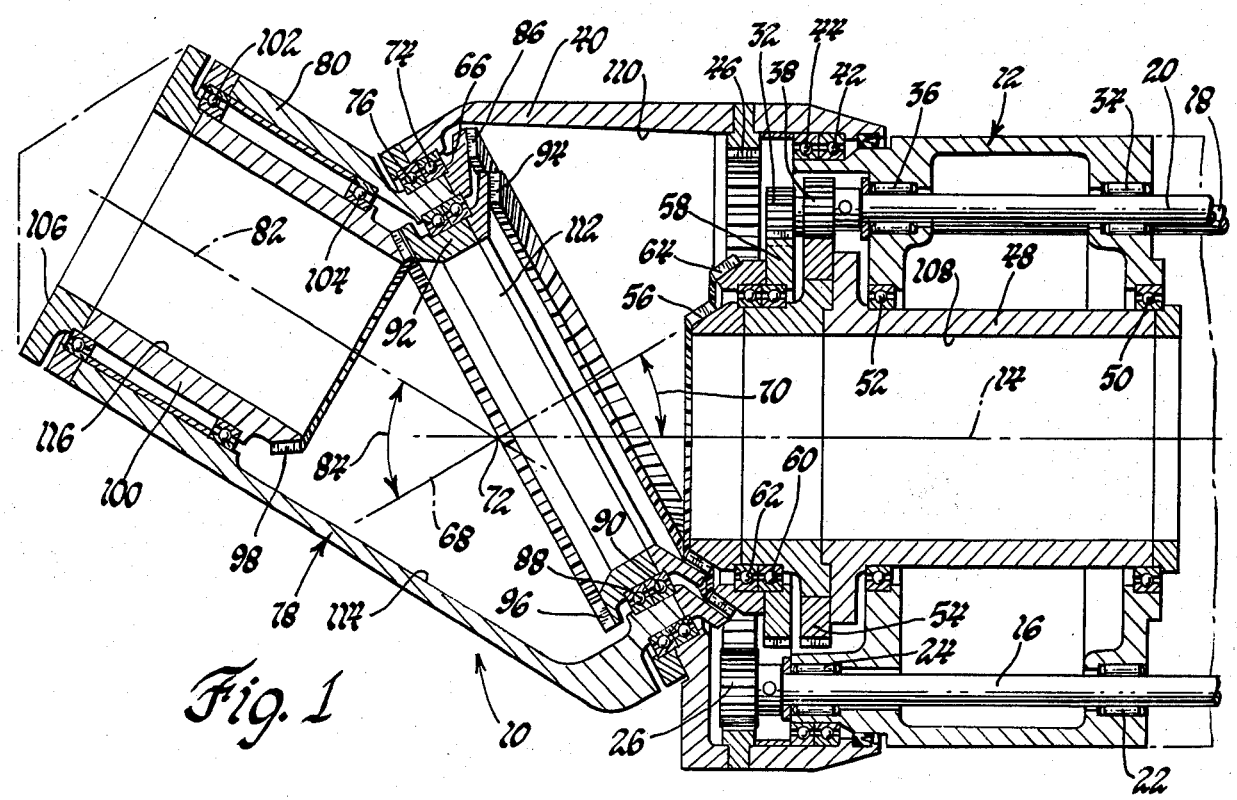

THREE-AXIS WRIST MECHANISM

This invention relates to wrist mechanisms and more particularly to such mechanisms having three independent axes of rotation.

Prior art devices, such as shown in U.S. Pat. No. 4,218,166 issued to Abu-Akeel et al. Aug. 19, 1980, permit independent movement about two axes while maintaining an unobstructed passage between a stationary base and a work tool, while U.S. Pat. Nos. 3,231,098 issued to Ainsworth Jan. 25, 1966, and 3,315,542 issued to Fortin et al. Apr. 25, 1967, provide multi-axes mechanisms but do not provide an unobstructed passageway. The use of an unobstructed passage has the advantage of providing protection for hoses and wires which deliver fluid and power to a work tool. However, the addition of a third axis of motion requires a unique gearing arrangement and housing structures to permit the use of an unobstructed passageway.

It is therefore an object of this invention to provide an improved wrist mechanism having three independent rotational axes which are mutually intersecting and to provide a gearing mechanism which will control the independent rotation of components supported for rotation on these axes and also provide an unobstructed internal passageway.

It is a further object of this invention to provide an improved mechanical wrist mechanism wherein three independent rotation axes having a mutual intersecting point provide selective positioning of a tool member in a substantially hemispherical envelope and also including three independently operable gear mechanisms which provide for rotation of two intermediate housings and a tool support mechanism respectively for establishing said tool positioning.

It is another object of this invention to provide an improved three-axis wrist mechanism for manipulating a tool member within a substantially hemispherical envelope wherein a stationary base member rotatably supports three input drive members which are connected through respective gear trains to a first housing, a second housing rotatably supported in the first housing, and a tool support member rotatably supported in the second housing and wherein each of these housings and support members are rotatable on their own respective axis.

These and other objects and advantages of the present invention will be more apparent from the following description and drawings in which:

FIG. 1 is a cross-sectional elevational view showing a wrist mechanism in one operating attitude; and FIG. 2 is a cross-sectional elevational view showing the wrist mechanism in another operating attitude.

Referring to the drawings, wherein like characters represent the same or corresponding parts throughout the views, there is seen a wrist mechanism 10 having a relatively stationary base member 12 adapted to be connected to a boom or support arm, not shown. The base 12 has a longitudinal axis 14 about which are circumferentially spaced a plurality of input or drive shafts 16, 18 and 20. The drive shaft 16 is rotatably supported in a pair of needle bearings 22 and 24 and has secured thereto a drive gear 26. The drive shaft 18 is rotatably supported in a pair of needle bearings 28 and 30 and has secured thereto a drive gear 32. The drive shaft 20 has a pair of needle bearings 34 and 36 and has secured thereto a drive gear 38.

The base 12 has a housing member 40 rotatably supported thereon by ball bearings 42 and 44 for rotation about the axis 14. Rotation of housing 40 about axis 14 is achieved through an integral gear 46 which meshes with drive gear 26 and therefore rotates in response to rotation of input shaft 16.

The base 12 has a sleeve member 48 rotatably supported thereon on ball bearings 50 and 52 for rotation about the axis 14. The sleeve 48 has secured thereto a gear member 54 which meshes with gear 38 such that upon rotation of input shaft 20, the sleeve 48 will rotate about axis 14. The sleeve 48 also has secured thereto a bevel gear 56.

The drive gear 32 on input shaft 18 meshes with a gear 58 which is supported for rotation about axis 14 on sleeve 48 by a pair of ball bearings 60 and 62. Secured to the gear 58 is a bevel gear 64.

The housing 40 has an aperture or opening 66 disposed about an intermediate axis 68 which is angularly displaced from axis 14 by the amount of angle 70. The axes 68 and 14 intersect at a point 72. The aperture 66 has secured therein a pair of ball bearings 74 and 76 which rotatably support in intermediate housing 78 for rotation about the axis 68.

As seen in FIG. 1, the housing 78 has a sleeve portion 80 extending along an axis 82 which is angularly displaced from the axis 68 by the amount of angle 84. The axis 82 intersects both axes 14 and 68 at the point 71 such that the three axes 14, 68 and 82 have a mutual point of intersection.

The intermediate housing 78 has secured thereto a bevel gear 86 which meshes with the bevel gear 64 such that upon rotation of gear 32 by input shaft 18, the intermediate housing 78 will be rotated about axis 68.

The intermediate housing 78 has secured therein a pair of ball bearings 88 and 90 which rotatably support a bevel gear assembly 92 for rotation about the axis 68. The bevel gear assembly 92 is comprised of a bevel gear 94 meshing with bevel gear 56 and a bevel gear 96. The bevel gear 96 meshes with a bevel gear 98 which is secured to or otherwise integrally formed on a tool support member 100 which is supported for rotation about axis 82 by ball bearings 102 and 104 which are secured in the intermediate housing 78.

The tool support member 100 has secured thereto a tool mounting surface 106 which is adapted to support a work tool such as a welder or paint sprayer or other device which is useful in the assembly or finishing of a product. The tool support member 100 is rotated about the axis 82 in response to rotation of the drive shaft 20 through the meshing of gears 38 and 54, bevel gears 56 and 94, and bevel gears 96 and 98.

As is seen in the drawings, sleeve member 48 has a longitudinal passage 108 which is unobstructed along axis 14. The housing 40 has a cavity 110 in which is disposed the gear assembly 92 which has an unobstructed central aperture 112. The intermediate housing 78 has a large internal cavity 114 also surrounding a portion of the gear assembly 92. The tool support member 100 has an unobstructed longitudinal opening 116 which is disposed along the axis 82. It is therefore readily apparent that an unobstructed passageway is provided from the relatively stationary base 12 to the tool mounting surface 106. This unobstructed passage can accommodate hoses and wires in a manner similar to that shown in U.S. Pat. No. 4,218,166.

The axis 82 can be moved from the position shown in FIG. 1 and aligned with the axis 68 by rotating the housing 40 180° while maintaining the position of intermediate housing 78 relative to housing 40. By rotating the housing 40 360°, the axis 82 will generate a cone having an angle of a measure equal to angle 84. The axis 82 can be moved from the position shown in FIG. 1 to the position shown in FIG. 2 by rotating the intermediate housing 78 180° relative to the housing 40, while the housing 40 is maintained stationary relative to the base 12.

From the position shown in FIG. 2, the tool mounting surface 106 can be rotated through 360° by rotation of housing 40 while maintaining housing 78 stationary relative thereto. By judicious rotation of housing 78, the axis 82 can be selectively positioned in an envelope defined by outer limits which are displaced from the axis 14 by the difference of the measure of angles 84 and 70 as one extreme and by the measure of the sum of the angles 70 and 84 as the other extreme. Within this envelope, the tool mounting surface 106 can be rotated substantially 360° such that universal positioning of a tool disposed on the mounting surface 106 can be attained. The selection of angles 78 and 84 determines the total envelope size. In the present disclosure, the measure of angle 70 is 30° while the measure of angle 84 is 60°. Other angular measures can be used depending on the envelope size desired.

The wrist mechanism 10 is particularly useful with robots which are controlled to perform various manufacturing and production processes such as spray painting and welding. The wrist mechanism 10 could be used with a clamp device which could be operated to position a component during assembly. The rotary motion of the input shafts 16, 18 and 20 can be accomplished by any of the available well-known rotary drive devices such as electric motors, pneumatic motors or hydraulic motors. If desired, the input shafts 16, 18 and 20 can be manipulated manually. It will also be apparent that the rotation of these input shafts can be controlled in a desired pattern by using a computer having an appropriate program to control the rotation of the input shafts. These devices are only cited by way of example and it will be apparent from the foregoing description, that the wrist mechanism 10 can be useful in most instances where a universal positioning device is necessary.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A mechanical wrist mechanism for positioning a work tool comprising; a relatively stationary base, three independent rotational axes having a point of mutual intersection with two of said axes being angularly fixed relative to each other and one of the axes being angularly fixed relative to said base and the third of said axes being movable angularly relative to the both of the two axes and angularly alignable with the other axis while maintaining the point of mutual intersection; a tool support member rotatable on the third of said axes including a tool mounting surface; a pair of housing means rotatably supported on respective ones of the two said axes; gear means for providing independent rotation of said support member and said housing means about their respective axis for selectively establishing the positioning of said tool mounting surface within a substantially hemispherical envelope; and continuously unobstructed passage means between the base and the tool mounting surface including cavities in said base, said housing means and said tool support member for the enclosed containment of work tool related structures.

2. A mechanical wrist mechanism for positioning a work tool comprising; a relatively stationary base, three independent rotational axes having a point of mutual intersection with two of said axes being angularly fixed relative to each other and one of the axes being angularly fixed relative to said base and the third of said axes being movable angularly relative to the both of the two axes and angularly alignable with the other axis while maintaining the point of mutual intersection; a tool support member rotatable on the third of said axes including a tool mounting surface; a pair of housing means rotatably supported on respective ones of the two of said axes; gear means for providing independent rotation of said support member and said housing means about their respective axis for selectively establishing the positioning of said tool mounting surface within an envelope having one extreme determined by the difference of the measure of the angles between the one axis and the third axis and another extreme determined by the sum of the measure of these angles; and continuously unobstructed passage means between the base and the tool mounting surface including cavities in said base, said housing means and said tool support member for the enclosed containment of work tool related structures.

3. A three-axis wrist mechanism for manipulating a tool member comprising; a relatively stationary base; an input sleeve supported on said base for rotation about an input axis and having an unobstructed longitudinal opening; a tool supporting sleeve supported on an output axis and having a tool support surface and an unobstructed longitudinal opening; a first housing supported on said base for rotation about the input axis; a second housing supported on said first housing for rotation about an intermediate axis and said second housing rotatably supporting said tool supporting sleeve; said first and second housing each having an unobstructed internal cavity permitting unobstructed communication between said longitudinal openings in said input sleeve and said tool supporting sleeve; three gear train means each having a member supported for rotation about the input axis and each having members drivingly connected to and rotatable with said first housing, said second housing and said tool supporting sleeve respectively; and input drive means for each of said three gear train means for selectively rotating the components connected thereto, for selectively positioning the tool support surface while unobstructed space availability between the longitudinal openings is maintained to permit the passage of work required components from outside of said wrist mechanism through said longitudinal openings to a tool mounted on said tool support surface.

* * * * *